(12) United States Patent
Choe et al.

(10) Patent No.: US 9,557,591 B2
(45) Date of Patent: Jan. 31, 2017

(54) ELECTRONIC DEVICE WITHOUT FRONT CASE FRAME

(71) Applicant: Samsung Electronics Co., Ltd., Gyeonggi-do (KR)

(72) Inventors: Sun-Jong Choe, Gyeonggi-do (KR); Jae-Ki Kim, Gyeonggi-do (KR); Hyo-Sung La, Seoul (KR); Young-Bae Ji, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 14/489,347

(22) Filed: Sep. 17, 2014

(65) Prior Publication Data

US 2015/0077655 A1 Mar. 19, 2015

(30) Foreign Application Priority Data

Sep. 17, 2013 (KR) ........................ 10-2013-0111954

(51) Int. Cl.
*G02F 1/1333* (2006.01)
*G06F 1/16* (2006.01)
*G02F 1/1345* (2006.01)
*H04M 1/02* (2006.01)

(52) U.S. Cl.
CPC ..... *G02F 1/133308* (2013.01); *G02F 1/13452* (2013.01); *G06F 1/1643* (2013.01); *G06F 1/1684* (2013.01); *G06F 1/1688* (2013.01); *H04M 1/0266* (2013.01); *G02F 2001/133314* (2013.01)

(58) Field of Classification Search
CPC G02F 1/133308; G06F 1/1643; G06F 1/1688; G06F 1/1684
See application file for complete search history.

(56) References Cited

U.S. PATENT DOCUMENTS

2010/0231356 A1* 9/2010 Kim ........................ G06F 3/048
340/5.83
2012/0063074 A1* 3/2012 Matsuda ............. H04M 1/0266
361/679.01

FOREIGN PATENT DOCUMENTS

JP 2004-088653 3/2004
JP 2005-012738 1/2005

* cited by examiner

*Primary Examiner* — Joseph L Williams

(57) ABSTRACT

An electronic device includes a case frame including a component receiving space, a substrate assembly received in the component receiving space of the case frame, and a display module electrically connected to the substrate assembly and coupled to the case frame to form an exterior of the electronic device. Thus, the electronic device can lower a production cost by reducing the number of the components, increase production efficiency by reducing the assembly processes, and achieve slimness and lightness compared to a conventional electronic device.

17 Claims, 12 Drawing Sheets

ELECTRONIC DEVICE WITHOUT FRONT CASE FRAME

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 17, 2013, and assigned Serial No. 10-2013-0111954, the entire disclosure of which is hereby incorporated by reference.

TECHNICAL FIELD

The present disclosure relates generally to an electronic device. More particularly, the present disclosure relates to an electronic device without a front case frame.

BACKGROUND

In accordance with advances of multimedia technology, electronic devices having various functions are emerging. Such electronic device mostly includes a convergence function which combines one or more functions.

The electronic devices include a large-screen touch-type display module, and a high-pixel camera module for capturing a still picture and a moving picture in addition to a basic communication function with other part. Also, the electronic devices can play multimedia contents such as music and video, and surf the web by accessing a network. The electronic devices are notably advancing to more rapid and various convergence functions using a high-performance processor such that their main communication function with the other party is treated as an additional function.

While the electronic devices diversify the functions, a more portable device can be more competitive. It is natural that users prefer slimmer and simpler electronic devices with the same functions. Thus, electronic device manufacturers are competing with each other to develop slimmer and simpler electronic devices with the same or better functionality than other products.

SUMMARY

To address the above-discussed deficiencies, it is a primary aspect of the present disclosure to provide a slimmer electronic device for the same or better functionality.

Another aspect of the present disclosure is to provide an electronic device for enhancing production efficiency by reducing assembly processes.

Yet another aspect of the present disclosure is to provide an electronic device for lowering a production cost by reducing the number of components.

Still another aspect of the present disclosure is to provide an electronic device having an assembly structure allowing smooth connection between a display module and a substrate.

A further aspect of the present disclosure is to provide a slim and simple electronic device for improving stiffness by use of a stiffness reinforcement structure.

According to one aspect of the present disclosure, an electronic device includes a case frame including a component receiving space; a substrate assembly received in the component receiving space of the case frame; and a display module electrically connected to the substrate assembly and coupled to the case frame to form an exterior of the electronic device.

According to another aspect of the present disclosure, an electronic device includes a rear case frame comprising a component receiving space; a substrate received in the component receiving space of the rear case frame; a metallic shield can mounted on the substrate and comprising a hamming part which is folded at least once along a rim; at least one subassembly mounted in at least one of the shield can, the substrate, and the rear case frame; at least one subunit assembly mounted in the subassembly and electrically connected to the substrate; a window finally stacked on the rear case frame and forming an exterior of the electronic device; a Liquid Crystal Display (LCD) unit attached under the window; an LCD connector drawn from the LCD unit and connected to a back side of the substrate exposed through a connector through hole of the rear case frame by penetrating or detouring the shield can and the substrate; and a connector cover for facing the connector through hole of the rear case frame connected to the LCD connector.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
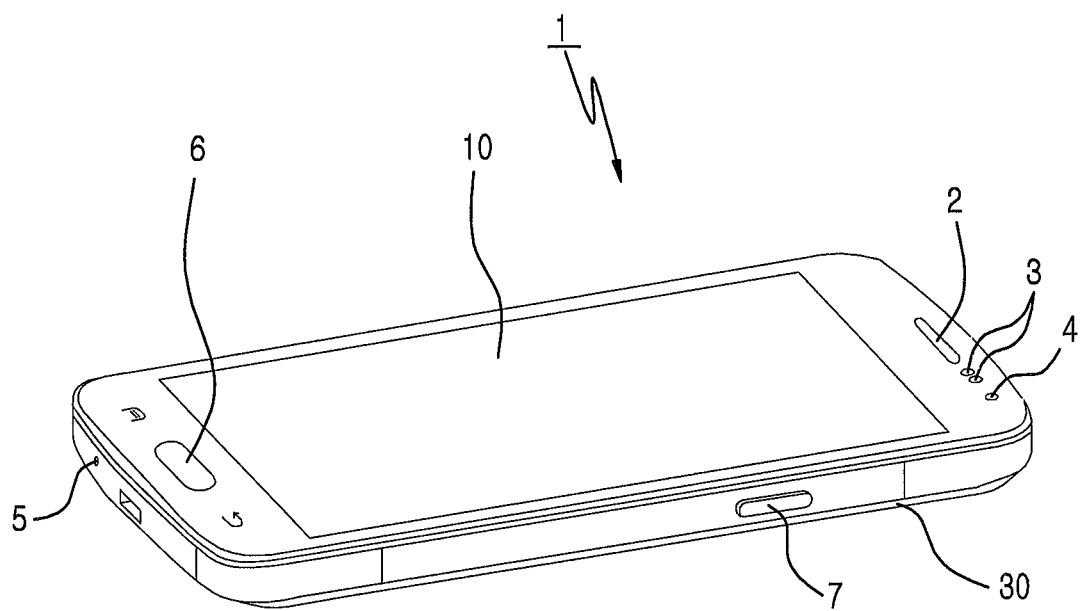
FIG. 1 illustrates a perspective view of an electronic device according to an exemplary embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device can include a case frame including a component receiving space; a substrate assembly received in the component receiving space of the case frame; and a display module electrically connected to the substrate assembly and coupled to the case frame to form an exterior of the electronic device.

The display module can include a window; and a Liquid Crystal Display (LCD) unit mounted under the window. A touch sensor can be interposed between the window and the LCD unit. The display module can be a touch screen including a touch sensor.

The LCD unit includes an LCD connector for electrically connecting to the substrate assembly. The LCD connector can be electrically connected to a back side of the substrate assembly exposed in a back side of the case frame by detouring or penetrating the substrate assembly.

The case frame includes a connector through hole for exposing the LCD connector drawn from the LCD unit; and a separate connector cover for facing the connector through hole after the LCD connector is connected to the back side of the substrate assembly.

The LCD unit can include an LCD connector for electrically connecting to the substrate assembly. When the display module is coupled to the case frame, the LCD connector can be electrically connected to a connector port disposed in a front side of the substrate assembly at the same time.

The substrate assembly can include a substrate for mounting a plurality of electronic components; and a metallic component or plate connected to the substrate in between the substrate assembly and the display module to shield noise of the electronic components mounted on the substrate. The metallic component or plate can include a shield can.

At least one of the substrate and the shield can can further include at least one subassembly. At least one subunit assembly can be disposed in the subassembly and electrically connected to the substrate. The subunit assembly can include at least one of a hook, a boss, a joint, and a river, as a joint between a touch panel, a Light Emitting Diode (LED), a light guide plate, an electric connector, a button assembly, a switch, an ear jack, a Universal Serial Bus (USB), physical and electrical input/output means, and the components.

The shield can can include a hamming part folded at least once along a rim. A screw fastener can be formed around the hamming part to screw the case frame. The screw fastener can be lower than a surface of the shield can using a drawing work, and in the drawing work, at least one process hole can be formed around the screw fastener to smoothly draw a peripheral area and to prevent deformation and disconnection of the hamming part.

The display module can be secured to the case frame using a double-sided tape. The double-sided tape can stick the window and the LCD unit or the assembly comprising the LCD unit together.

The double-sided tape can include a cut line along a boundary between a window adhesive area and an adhesive area of the LCD unit or the assembly comprising the LCD unit such that, when the display module is separated from the case frame, only the double-sided tape of a window area may be separated along the cut line. An LCD assembly can include not only the LCD unit adhesive area but also the LCD and an auxiliary component for guiding the LCD.

A tape attaching surface can be formed along a rim inside the case frame for attaching a rim of the window using the double-sided tape. The tape attaching surface for sticking the double-sided tape can be higher than or equal to an inner attaching surface of the case frame excluding the tape attaching surface. An allowance between the tape attaching surface and the inner attaching surface of the case frame can range 0.03 mm~0.05 mm.

An electronic device can include a rear case frame comprising a component receiving space; a substrate received in the component receiving space of the rear case frame; a metallic shield can mounted on the substrate and comprising a hamming part which is folded at least once along a rim; at least one subassembly mounted in at least one of the shield can, the substrate, and the rear case frame; at least one subunit assembly mounted in the subassembly and electrically connected to the substrate; a window finally stacked on the rear case frame and forming an exterior of the electronic device; an LCD unit attached under the window; an LCD connector drawn from the LCD unit and connected to a back side of the substrate exposed through a connector through hole of the rear case frame by penetrating or detouring the shield can and the substrate; and a connector cover for facing the connector through hole of the rear case frame connected to the LCD connector.

So far, the portable communication electronic device including the display module has been illustrated and described. The present disclosure is not limited to this electronic device but applicable to various electronic devices including the display module.

While the touch screen includes the touch sensor in the display module, the electronic device can include the display module which employs only the LCD unit alone.

The present disclosure can be applied to various electronic device including the display on the front side, for example, a Personal Digital Assistant (PDA), a laptop computer, a mobile phone, a smart phone, a netbook, a Mobile Internet Device (MID), an Ultra Mobile Personal Computer (UMPC), a tablet PC, a navigation device, an MP3 player, and a wearable electronic device.

FIG. 1 illustrates a perspective view of an electronic device according to an exemplary embodiment of the present disclosure.

Referring to FIG. 1, a front side of the electronic device 1 includes a display module 10, a speaker 2 above the display module 10 for receiving a voice of the other party, and a microphone 5 below the display module 10 for sending a voice to the other party. Thus, the electronic device 1 can perform a basic communication function.

Electronic components for various functions of the electronic device 1 can be disposed around the speaker 2 of the electronic device 1. Such components can include a camera 4 for Video Telephony (VT) with the other party. The electronic device 1 can include a sensor 3 for variably operating the electronic device 1 according to a surrounding environment. The sensor 3 can include a light sensor for automatically detecting an ambient illuminance and adjusting a brightness of the display according to the detected illuminance, and/or a proximity sensor for deactivating the display module 10 when detecting a user's head portion attached during a phone call. The front side of the electronic device 1 may include a physical key button 6 exposed through the display module 10. The key button 6 can be used a home button. A lateral side of the electronic device 1 may include another physical key button 7 exposed through a rear case frame 30. The key button 7 can be used as a volume-up/down button or a wakeup button. The electronic device 1 can include other various mechanical structures (not shown).

A conventional electronic device can form its exterior by coupling a front case frame (or bracket) and a rear case frame, and expose the display module through an opening formed in the front side of the front case frame. Disadvantageously, the conventional electronic device increases total weight and volume due to the front case frame or bracket, which goes against recent slim and light electronic devices.

Unlike the conventional electronic device, the electronic device 1 does not include the front case frame. According to exemplary embodiments of the present disclosure, a window of the display module 10 is coupled to the rear case frame 30 to thus form the exterior of the electronic device 1. Hence, the electronic device 1 can be fabricated by mounting a substrate assembly inside the rear case frame 30 and then stacking the display module 10 on them.

Now, the electronic device according to exemplary embodiments of the present disclosure is explained in detail.

Figure 2:
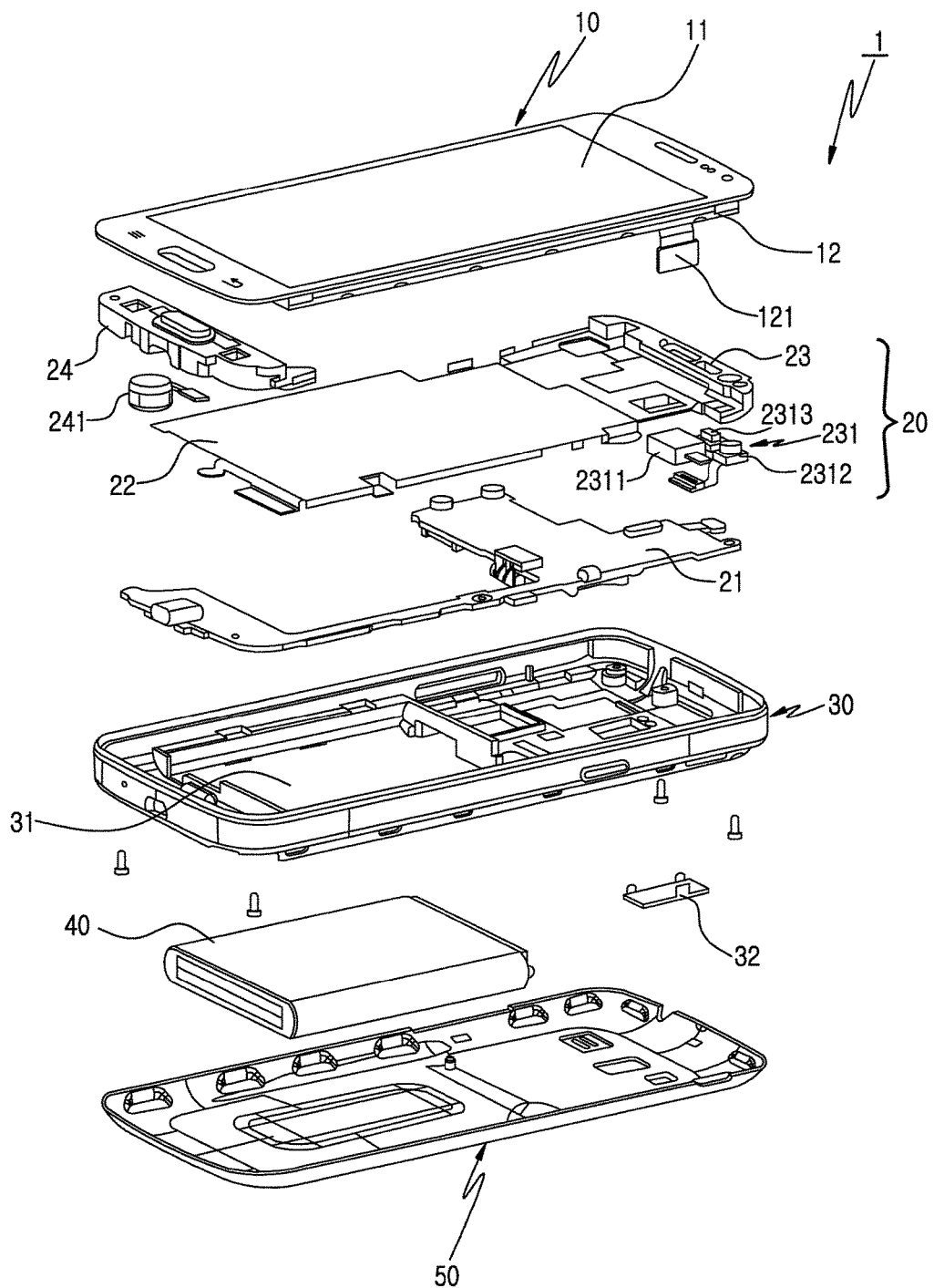
FIG. 2 illustrates an exploded view of the electronic device according to an exemplary embodiment of the present disclosure.

FIG. 2 illustrates an exploded view of the electronic device according to an exemplary embodiment of the present disclosure.

Referring to FIG. 2, the electronic device 1 can include the rear case frame 30, a substrate assembly 20 mounted in a space of the rear case frame 30, and a display module 10 stacked on the rear case frame 30 including the substrate assembly 20. The electronic device 1 can further include a battery pack 40 serving as a power supply means at the back of the rear case frame 30, and a battery cover 50 attached and detached for facing the back side of the rear case frame 30 including the battery pack 40. The rear case frame 30 can include an opening 31 for mounting the battery pack 40.

The display module 10 can include a window 11 and a Liquid Crystal Display (LCD) unit 12 disposed under the window 11. The display module 10 can be used as a touch screen (not shown) for both of data input and data output.

Locations of the window 11 and the LCD unit 12 of the display module 10 can be arranged using an aid. For example, the window 11 and the LCD unit 12 can be coupled using a double-sided tape. The double-sided tape can be applied to an inactive area along a rim of the LED unit 12. The window 11 may apply the double-sided tape to a Black Mask (BM) area. For example, the double-sided tape may be disposed in an overlapping area of the BM area of the window 11 and the inactive area of the LCD unit 12.

A touch sensor can be disposed under the window 11, that is, in a surface contacting the LCD unit 12. The touch sensor of a pad type can be disposed under the window 11. The touch sensor may be disposed by depositing Indium Tin Oxide (ITO) on the lower side of the window 11. For example, a touch panel connector 111 can extend from one side of the window 11 to electrically connect to a substrate 21 to be explained. The touch sensor may adopt an in-cell type.

Referring to FIG. 2, the substrate assembly 20 can include the substrate 21 of a certain shape, and a shield can 22 or a plate-type metallic component interposed between the substrate 21 and the display module 10 to block noise caused by an electronic function group mounted on the substrate 21. The shield can 22 can be fastened to the substrate 21 using a screw. The shield can 22 may be fastened to the substrate 21 and the rear case frame 30 using a fastening means such as screw.

The substrate 21 can further include one or more subassemblies 23 and 24. The subassemblies 23 and 24, which are formed of a dielectric substance, can be secured to the substrate 21 or the rear case frame 30. The subassemblies 23 and 24 can accommodate one or more subunits corresponding to various functions required by the electronic device 1. When a separate connector or the subassembly 23 and 24 is connected to the substrate 21, the subunits may be electrically connected by direct contact such as contact pad. After the substrate 21 is fastened to the rear case frame 30 using the screw, the subassemblies 23 and 24 may be mounted on them. The subassemblies 23 and 24 may be fastened to the substrate 21 or the rear case frame 30 using a screw.

Figure 3:
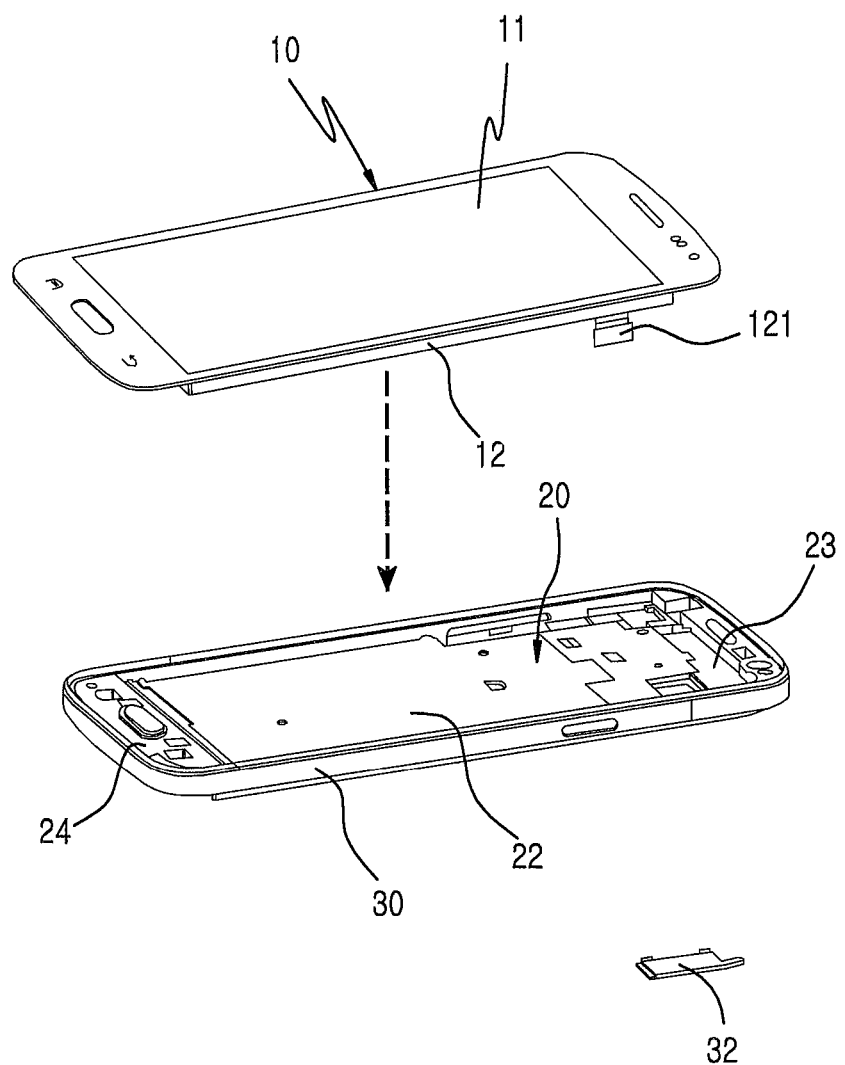
FIG. 3 illustrates an exploded view of a display module of the electronic device assembled with a rear case frame including a substrate assembly according to an exemplary embodiment of the present disclosure.

The upper assembly 23 can be mounted in an upper part of the substrate 21 and the lower assembly 24 can be mounted in a lower part of the substrate 21 as shown in FIG. 3. The upper assembly 23 can include at least one subunit assembly 231. The subunit assembly 231 can include a speaker unit 2311, a sensor unit 2313, and a camera unit 2312 in a single structure, and be mounted in the upper assembly 23. The lower assembly 24 can accommodate a microphone unit 241. The lower assembly 24 can further accommodate a radiation pattern (not shown) for an antenna. The lower assembly 24 can include at least one of a hook, a boss, a joint, and a river, as a joint between a touch panel, a Light Emitting Diode (LED), a light guide plate, an electric connector, a button assembly, a switch, an ear jack, a Universal Serial Bus (USB), physical and electrical input/output means, and the components. In this case, the lower assembly 24 may have a certain height and the same function as an antenna carrier disposed at regular intervals from the ground of the substrate.

The electronic device 1 can be assembled in the following order. First, the upper assembly 23 can be connected to the shield can 22. For example, the upper assembly 23 can be fastened to the shield can 22 using a screw. Next, the shield can 22 including the upper assembly 23 can be connected to the substrate 21. The shield can 22 and the substrate 21 can be fastened using a screw. Next, the substrate 21 including the shield can 22 and the upper assembly 23 is received in the rear case frame 30, and the lower assembly 24 can be coupled to the corresponding location. Next, the display module 10 can be received on the substrate assembly 20. The display module 10 can be attached to the rear case 30 and the upper and lower assemblies 23 and 24 using the double-sided tape. The double-sided tape can be attached to a tape adhesive surface which protrudes along an inner rim of the rear case frame 30. Finally, the assembly is completed by tightening a plurality of screws to at least one of the substrate 21, the shield can 22, and the upper and lower assemblies 23 and 24 from the back side of the rear case frame 30.

Figure 4:
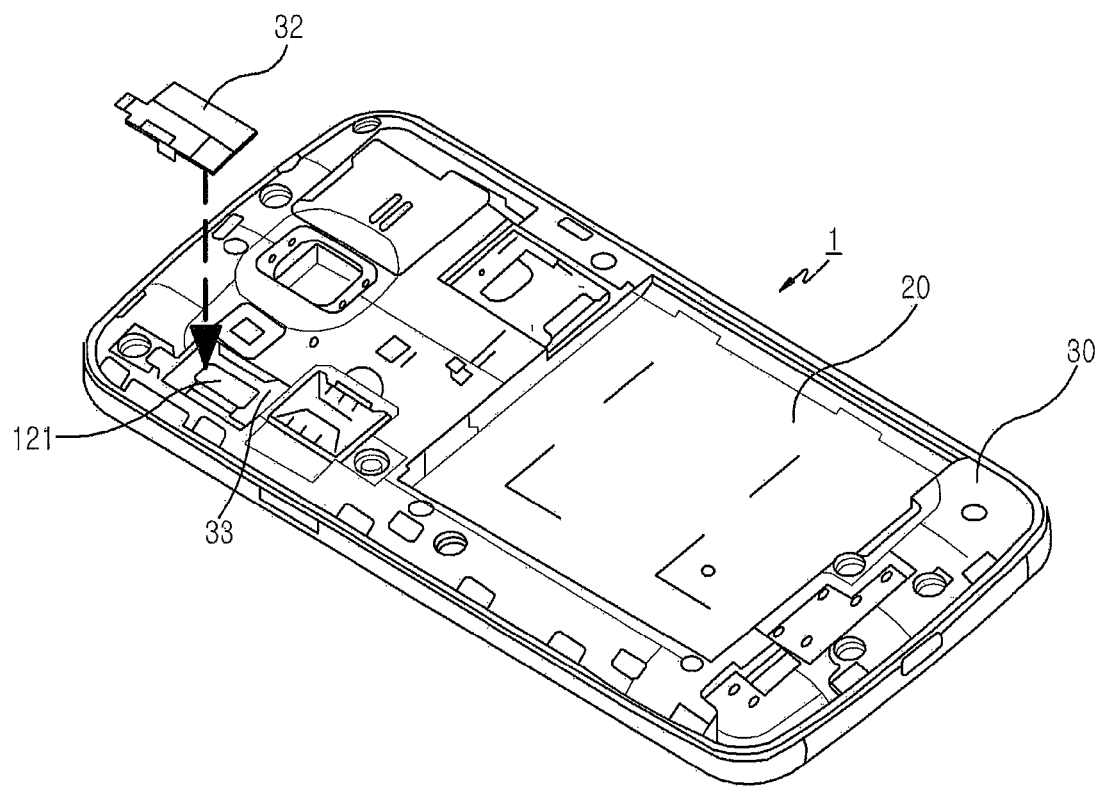
FIG. 4 illustrates a rear perspective view of the electronic device where the display module is fit into the rear case frame including the substrate assembly according to an exemplary embodiment of the present disclosure.

FIG. 3 illustrates an exploded view of the display module of the electronic device assembled with the rear case frame including the substrate assembly according to an exemplary embodiment of the present disclosure. FIG. 4 illustrates a rear perspective view of the electronic device where the display module is fit into the rear case frame including the substrate assembly according to an exemplary embodiment of the present disclosure.

Referring to FIG. 3, while the assembly structure of the electronic device needs to electrically connect the LCD connector 121 of the LCD unit 12 of the display module 10 to the substrate 21, the shield can 22 for blocking the noise is substantially interposed between the display module 10 and the substrate 21.

The LCD connector 121 drawn from the LCD unit 12 can be finally connected by penetrating or detouring the substrate 21 using a through hole 33 of the rear case frame 30. Such a structure is quite useful for the assembly of the electronic device 1 and can prevent poor connection due to the assembly error when the display module 10 and the substrate 21 are contacted for the assembly. Since this structure secures the display modules 10 to the rear case frame 30 and then finally connects them, the structure can not only support them stably with the mechanical structure but also achieve a minimum connection length.

Referring to FIG. 4, when the display module 10 is completely assembled on the rear case frame 30, the LCD connector protruding at the back can be bent and connected to a connector port exposed in the substrate 21. For example, the LCD connector 121 is connected to the substrate 21 and then the connector through hole 33 is faced using a separate connector cover 32. Thus, the exterior of the back side of the rear case frame 30 can be decorated finely. For example, the connector cover 32 can be screwed to the connector through hole 33 of the rear case frame 30. For example, the connector cover 32 may be secured by itself or adhered to the connector through hole 33 of the rear case frame 30 without using a separate fastening means. For example, the connector cover 32 can be easily mounted or disconnected using the connector cover's 32 locking structure. For example, the connector cover 32 and the connector through hole 33 may have a snap-fit structure including a hook in at least one part.

Figure 5:
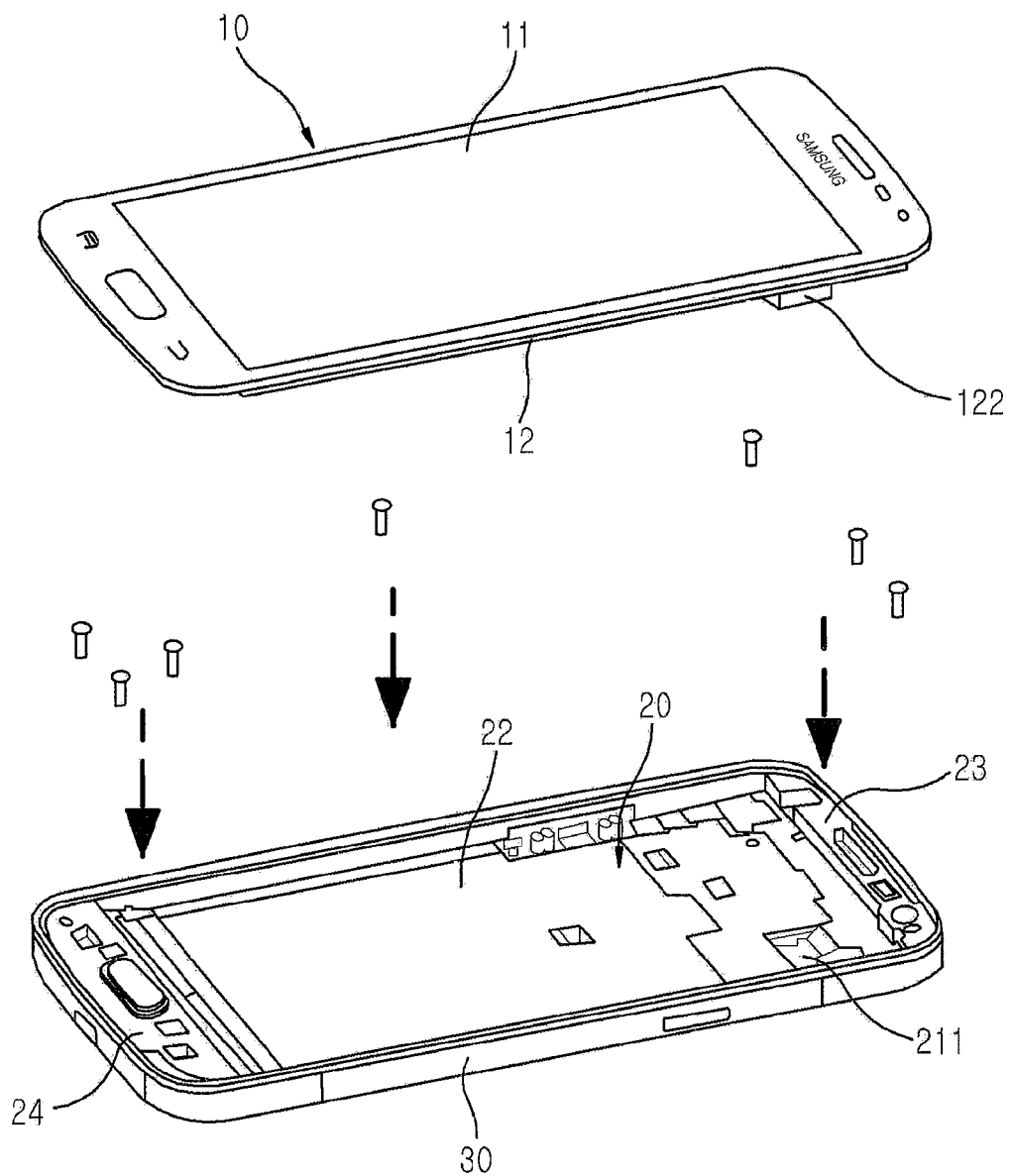
FIG. 5 illustrates an exploded view of the display module of the electronic device assembled with the rear case frame including the substrate assembly according to an exemplary embodiment of the present disclosure.

FIG. 5 illustrates an exploded view of the display module of the electronic device assembled with the rear case frame including the substrate assembly according to an exemplary embodiment of the present disclosure.

The LCD connector 121 is exposed to the back side through the connector through hole 33 of the rear case frame 30, connected to a corresponding connection part of the substrate 21 exposed in the connector through hole 33, and then faced by the connector cover 32.

When the display module 10 is finally assembled with the rear case frame 30 receiving the substrate assembly 20, the LCD connector 122 can electrically connect the display module 10 and the rear case frame. As shown in FIG. 5, a connector port 211 can be exposed in the receiving part of the substrate assembly 20 of the rear case frame 30 by avoiding the shield can 22. In this case, the mounted connector port 211 of the substrate 21 can be exposed. A length of the LCD connector 122 disposed under the window 11 of the display module 10 can be increased. When the display module 10 is received in the rear case frame 30, the LCD connector 122 can be concurrently connected electrically to the connector port 211. Since the display module 10 is attached to the rear case frame 30 and the upper and lower assemblies 23 and 24 using the double-sided tape, pressure can be imposed on the display module 10. To address this shortcoming, a stiffer area is defined in part of the substrate 21 so as to apply a different ductility per area even in a single Flexible Printed Circuit Board (FPCB). Since the direct contact between the LCD connector 122 and the substrate 21 based on the received display module 10 can eliminate the separate connector through hole and connector cover at the back of the rear case frame 30, the exterior of the back side of the rear case frame 30 can be decorated more finely.

As above, the upper assembly 23 is secured to the shield can 22, the shield can 22 is assemble with the substrate 21, the assembled substrate 21 is received in the rear case frame 30, and then the lower assembly 24 is finally secured in the corresponding area. It is noted that the upper and lower assemblies 23 and 24 can be assembled in various manners and various orders.

For example, the display module 10 may be assembled before the upper and lower assemblies 23 and 24 are assembled to the shield can 22 and/or the substrate 21.

For example, when the upper assembly 23 and the lower assembly 24 are mounted in the top end and the bottom end of the display module 10 respectively, it is highly likely that they may not be disposed at proper locations due to an assembly tolerance. For example, by use of a separate aid, the upper and lower assemblies 23 and 24 can be secured under the display module 10.

Figure 6:
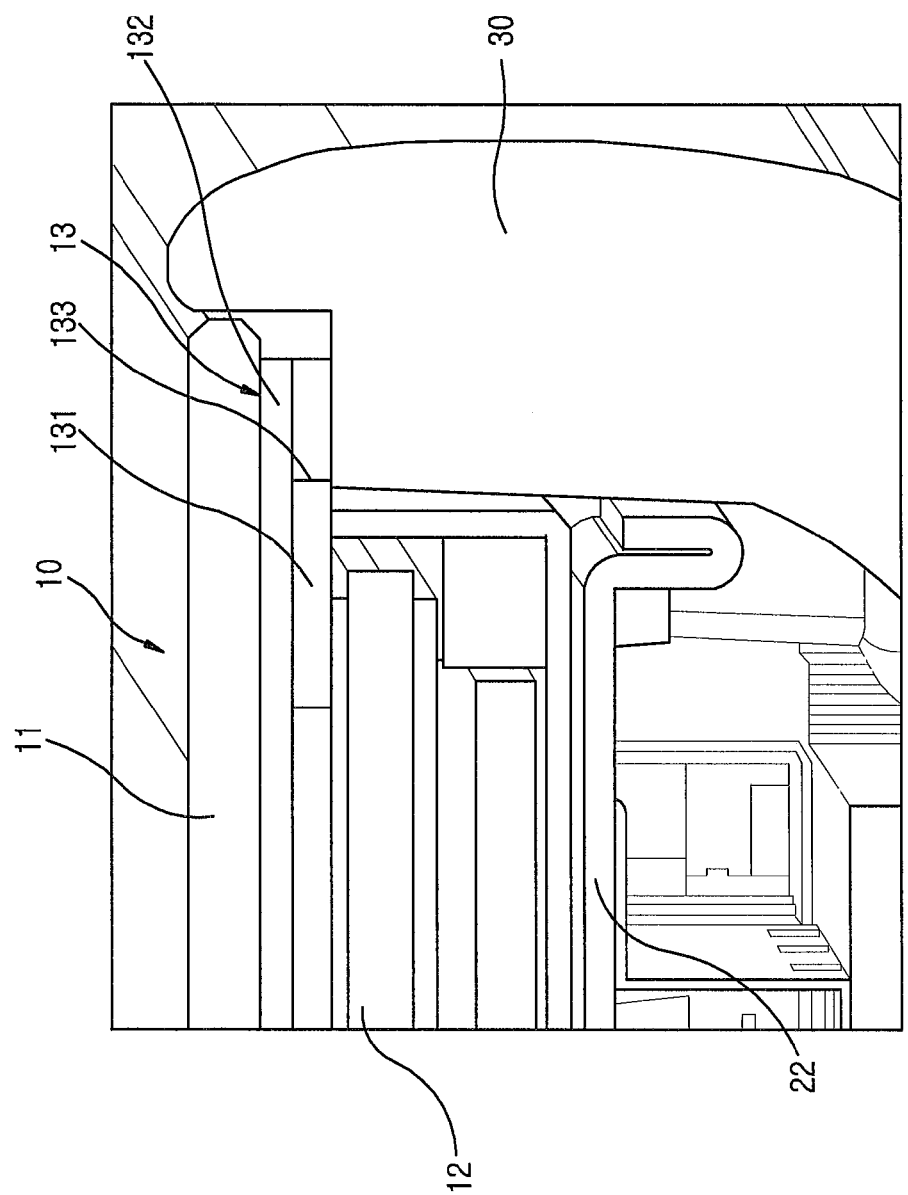
FIG. 6 illustrates a cross-sectional view of the electronic device according to an exemplary embodiment of the present disclosure.
Figure 7A:
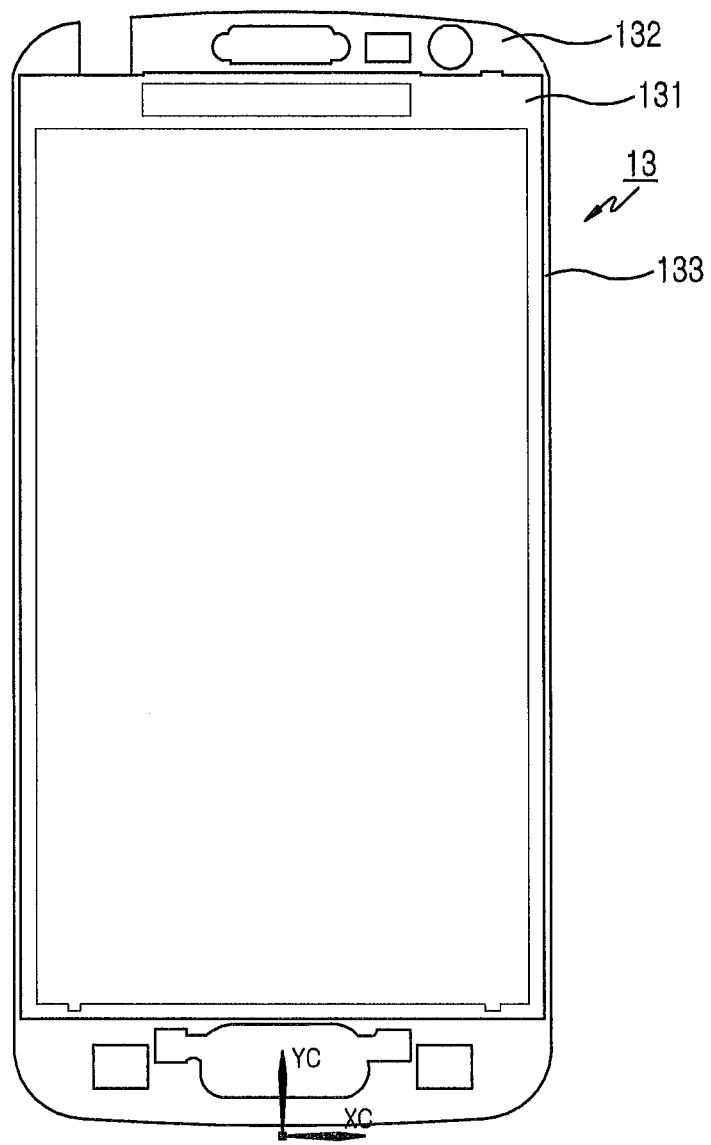
FIGS. 7A and 7B illustrate views of a double-sided tape applied to the electronic device according to an exemplary embodiment of the present disclosure.
Figure 7B:
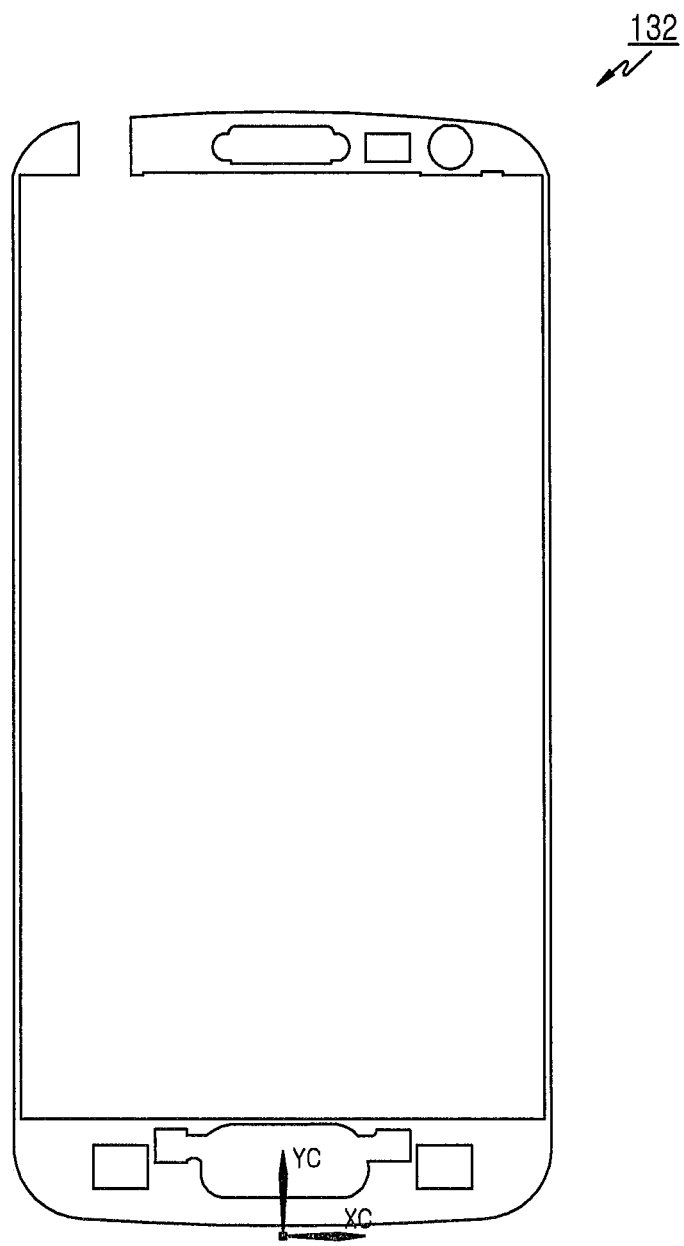

FIG. 6 illustrates a cross-sectional view of the electronic device according to an exemplary embodiment of the present disclosure. FIGS. 7A and 7B illustrate views of the double-sided tape applied to the electronic device according to an exemplary embodiment of the present disclosure.

Referring to FIG. 6, the display module 10 can be received on the rear case frame 30 receiving the substrate assembly 20. For example, the display module 10 can be attached to the rear case frame 30 and the upper and lower assemblies 23 and 24 using the double-sided tape 13. The double-sided tape 13 applied to the display module 10 can be used to fasten both of the LCD unit 12 and the window 11.

The conventional electronic device secures the window 11 and the LCD unit 12 using a single double-sided tape. However, when only the window of the display module is separated from the rear case frame for the sake of maintenance, it is required to separate not only the window but also the LCD unit.

By contrast, the double-sided tape 13 can be separately applied to the window joint part and the LCD unit joint part of the display module 10.

Referring to FIGS. 7A and 7B, when the display module 10 is first applied and secured to the rear case frame 30, the double-sided tape 13 can be used as a single piece. For example, the double-sided tape 13 can be used as a single piece and divided into a window attaching tape 132 applied to the window attaching area and a LCD attaching tape 131 applied to the LCD unit attaching area based on a cut line 133.

For example, when the window 11 is separated, the attached double-sided tape 13 can separate only the window attaching tape 132 applied to the window attaching part based on the cut line 133 formed along a boundary between the window attaching area and the LCD unit attaching area of the double-sided tape 13. For example, since the window attaching tape 132 alone is separated, the window 11 can be easily re-attached to the rear case frame 30 using only the window attaching tape 132.

Figure 8:
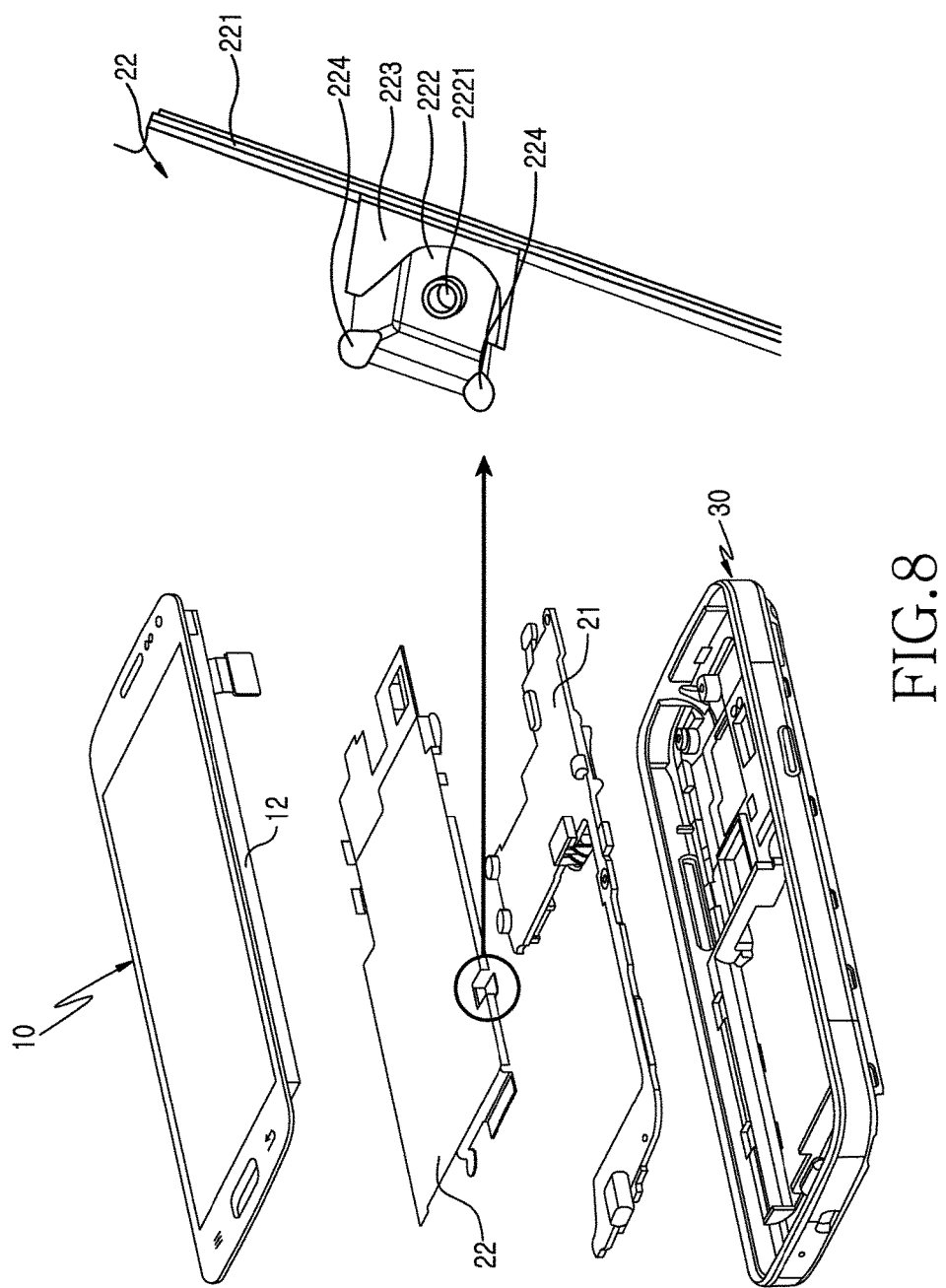
FIG. 8 illustrates a view of a shield can according to an exemplary embodiment of the present disclosure.
Figure 9:
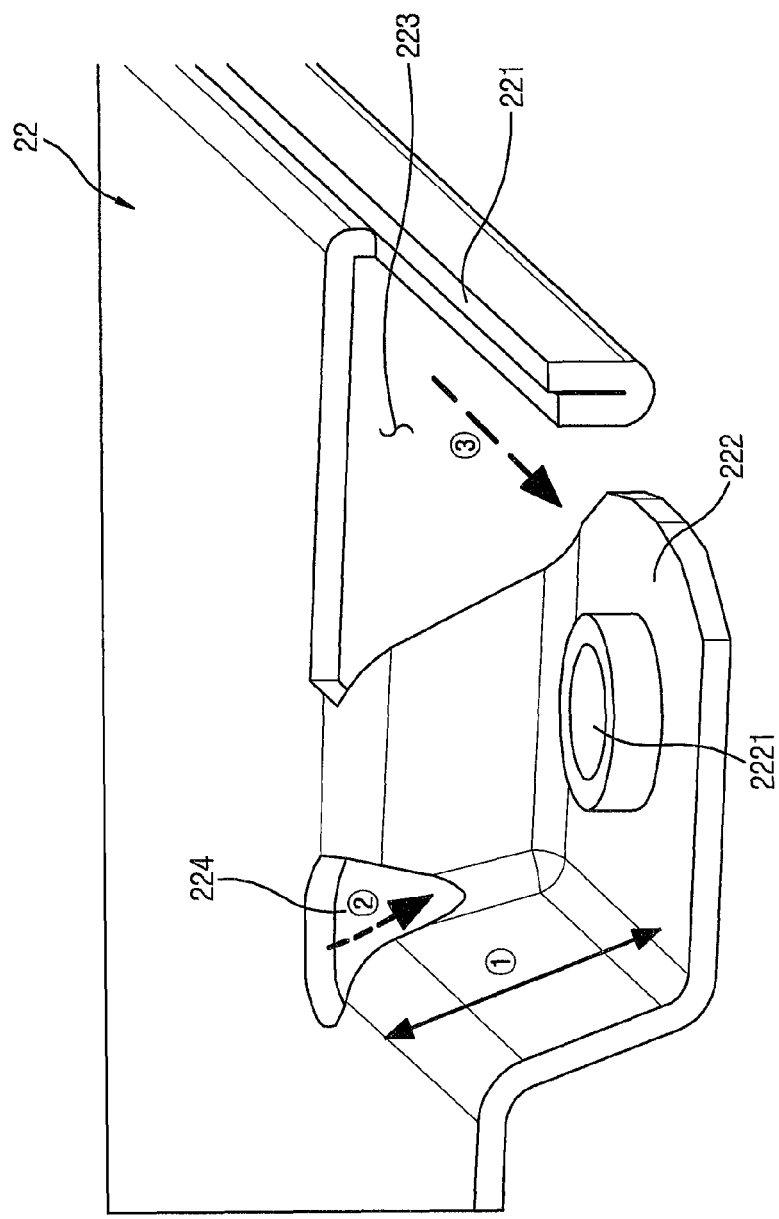
FIG. 9 illustrates a view of a screw fastener applied to the shield can according to an exemplary embodiment of the present disclosure.

FIG. 8 illustrates a view of the shield can according to an exemplary embodiment of the present disclosure. FIG. 9 illustrates a view of a screw fastener applied to the shield can according to an exemplary embodiment of the present disclosure.

The electronic device 1 can be remarkably lightened and slimmed without the conventional front case frame or the separate support bracket, whereas the electronic device 1 can be weakened. For example, the metallic shield can 22 is interposed between the substrate 21 and the display 10. However, since the shield can 22 is a thin film and vulnerable to an external force, a separate stiffness reinforcement structure is needed.

The shield can 22 can include a hamming part 221 which is folded along the rim. The hamming structure can reinforce the stiffness of the electronic device 1. While the shield can 22 includes the hamming structure which is bent and folded to face the opposite side as shown in FIG. 9, the hamming structure may be folded multiple times when the inner space of the electronic device 1 is allowed. When the rim of the shield can 22 is folded multiple times, the hamming part 221 may be bent to wave back and forth. For example, the rim of the shield can 22 can reinforce the stiffness by bending multiple times at a certain angel, instead of the hamming structure.

To reinforce the stiffness of the shield can 22, the rear case frame 30 and the shield can 22 can be screwed. In this case, the screw fastening part can be formed at the rim of the shield can 22. However, when the hamming port 221 formed at the rim of the shield can 22 is cut, the weak portion is exposed. Accordingly, it is important to achieve both of the uninterrupted hamming structure and the screw fastening structure.

Referring to FIG. 9, a plate-type screw fastener 222 including a screw fastening hole 2221 can be lower than the surface of the shield can 22 by a certain height ①. In this case, the screw fastener 222 can be formed using a drawing work. For example, to smoothly draw the areas around the shield can 22 during the drawing work and to prevent deformation of the hamming part, a plurality of process holes (openings ② and ③) can be formed around the screw fastener 222.

Figure 10:
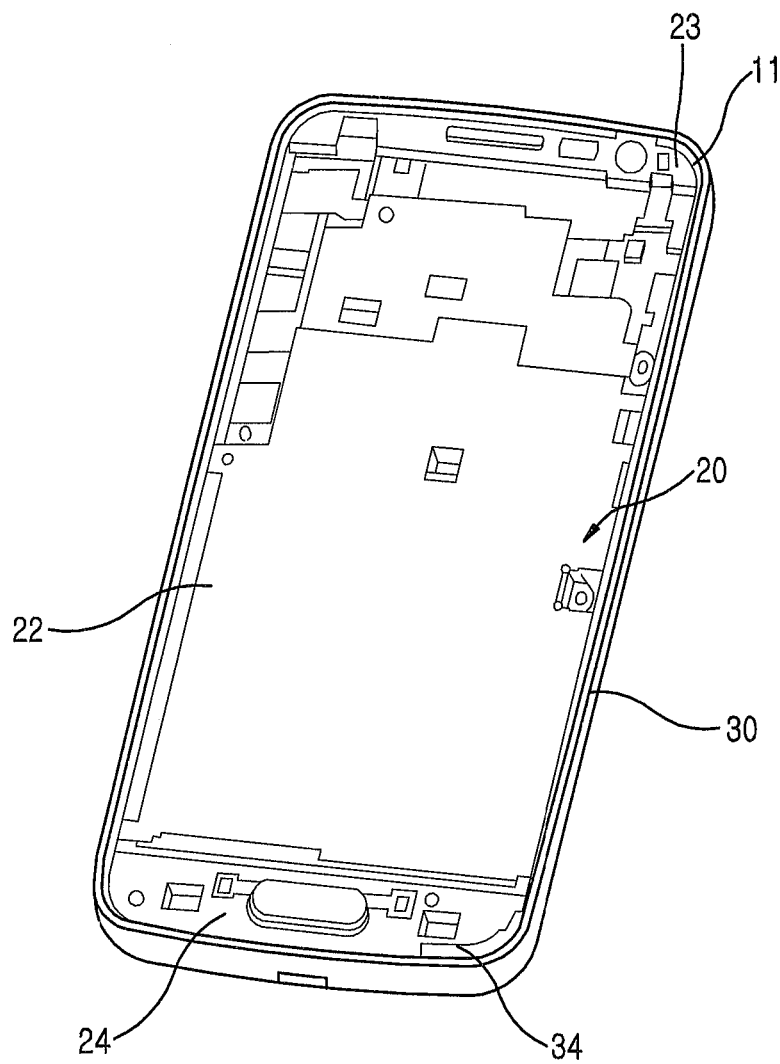
FIG. 10 illustrates a rear perspective view of the rear case frame including the substrate assembly according to an exemplary embodiment of the present disclosure.
Figure 11:
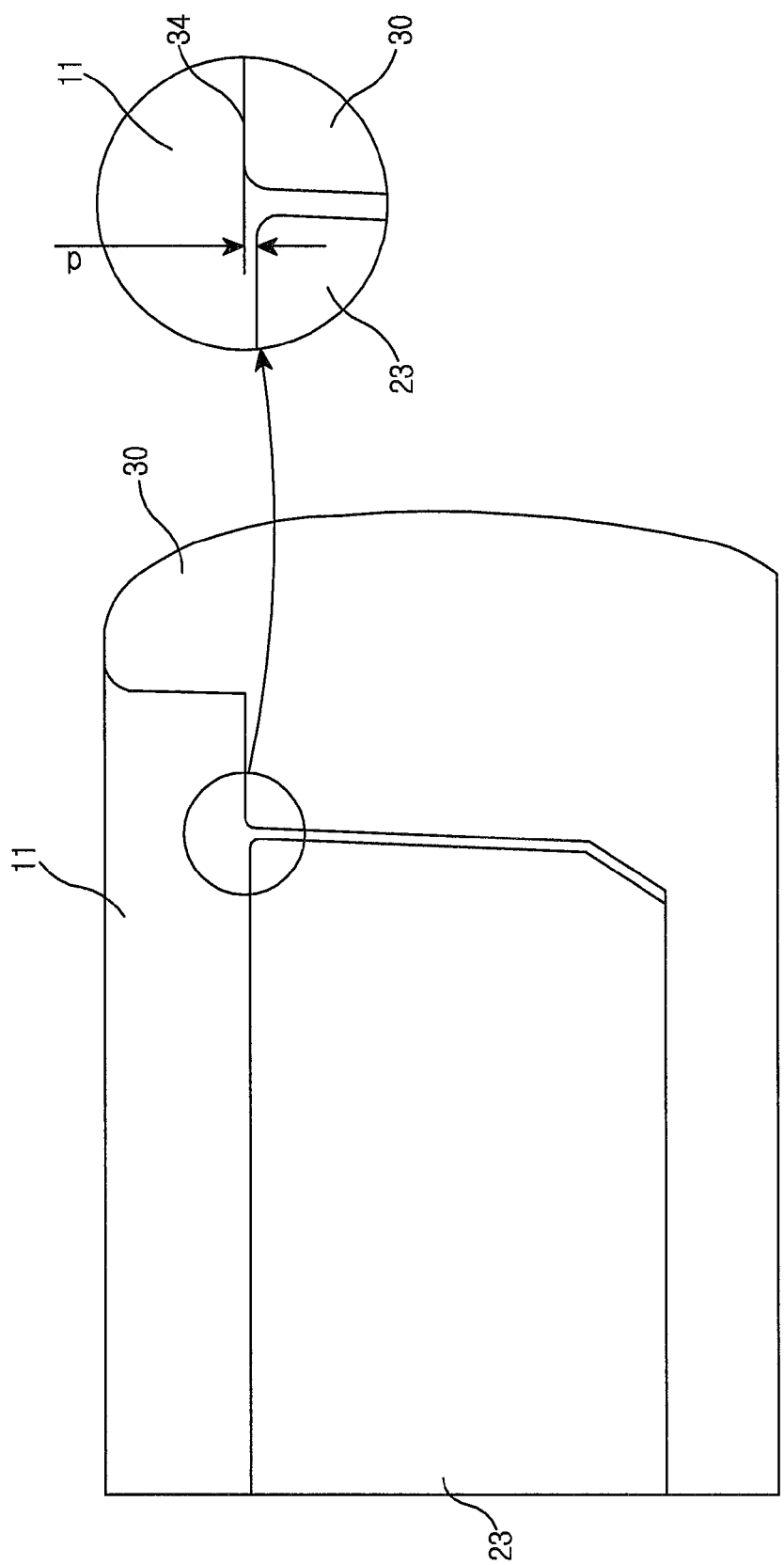
FIG. 11 illustrates a cross-sectional view of an adhesive surface between the rear case frame and a subassembly according to an exemplary embodiment of the present disclosure.

FIG. 10 illustrates a rear perspective view of the rear case frame including the substrate assembly according to an exemplary embodiment of the present disclosure. FIG. 11 illustrates a cross-sectional view of the adhesive surface between the rear case frame and a subassembly according to an exemplary embodiment of the present disclosure.

As shown in FIG. 10, after the substrate assembly 20 is received in the rear case frame 30, the display module 10 can be mounted on them. For example, when the display module 10 is seated on the rear case frame 30, the display module 10 is not attached successfully unless the tape attaching surface 34 of the inner rim of the rear case frame 30 and the LCD attaching surface disposed inwards from the tape attaching surface 34 or the attaching surface of the upper and lower assemblies 23 and 24 have the same height. Even when the display module 10 is attached, the tape at the different heights can be detached. When the attaching surface of the upper and lower assemblies 23 and 24 or the LCD unit 12 disposed inwards from the tape attaching surface 34 of the rear case frame 30 gets higher, the rim of the window 11 of the display module 10 is subject to a gap.

To address such shortcomings, the tape attaching surface 34 of the rear case frame 30 can get higher than the attaching surface of the upper assembly 23 as shown in FIG 11. A height allowance ranges 0.03 mm~0.05 mm and can prevent the gap of the window rim in advance. Likewise, the attaching surface of the lower assembly 24 or the LCD unit 12 can be lower than the tape attaching surface.

As set forth above, the electronic device can lower the production cost by reducing the number of the components, increase the production efficiency by reducing the assembly processes, and achieve the slimness and the lightness compared to the conventional electronic device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:
1. An electronic device, comprising:
   a case frame including a receiving space;
   a substrate assembly accommodated in the receiving space; and
   a display module including a window and a Liquid Crystal Display (LCD) unit mounted under the window, the display module electrically connected to the substrate assembly and coupled to the case frame to form an exterior of the electronic device, wherein the LCD unit includes an LCD connector for electrically connecting to the substrate assembly, and wherein the LCD connector is electrically connected to a back side of the substrate assembly exposed in a back side of the case frame by detouring or penetrating the substrate assembly.

2. The electronic device of claim 1, wherein a touch sensor is interposed between the window and the LCD unit.

3. The electronic device of claim 1, wherein the case frame comprises:
   a connector through hole configured to expose the LCD connector drawn from the LCD unit; and
   a separate connector cover configured to face the connector through hole after the LCD connector is connected to the back side of the substrate assembly.

4. An electronic device comprising:
   a case frame including a receiving space;
   a substrate assembly accommodated in the receiving space; and
   a display module including a window and a Liquid Crystal Display (LCD) unit mounted under the window, the display module electrically connected to the substrate assembly and coupled to the case frame to form an exterior of the electronic device,
   wherein the LCD unit includes an LCD connector configured to electrically connect to the substrate assembly, and
   wherein, when the display module is coupled to the case frame, the LCD connector is electrically connected to a connector port disposed in a front side of the substrate assembly at a same time.

5. An electronic device comprising:
   a case frame including a receiving space;
   a substrate assembly accommodated in the receiving space; and
   a display module electrically connected to the substrate assembly and coupled to the case frame to form an exterior of the electronic device,
   wherein the substrate assembly comprises:
      a substrate configured to mount a plurality of electronic components; and
      a metallic component or plate connected to the substrate in between the substrate assembly and the display module, the metallic component or plate configured to shield noise of the electronic components mounted on the substrate.

6. The electronic device of claim 5, wherein the metallic component or plate is a shield can configured to shield the noise.

7. The electronic device of claim 6, wherein at least one of the substrate or the shield can further comprises:
   at least one subassembly.

8. The electronic device of claim 7, wherein at least one subunit assembly is disposed in the subassembly and electrically connected to the substrate.

9. The electronic device of claim 8, wherein the subunit assembly comprises at least one of a microphone unit, a sensor unit, a camera unit, a speaker unit, a vibration unit, or an antenna radiator.

10. The electronic device of claim 5, wherein the shield can comprises:
    a hamming part folded at least once along a rim.

11. The electronic device of claim 10, wherein a screw fastener is formed around the hamming part to screw the case frame.

12. The electronic device of claim 11, wherein the screw fastener is lower than a surface of the shield can using a drawing work, and
    in the drawing work, at least one process hole is formed around the screw fastener to smoothly draw a peripheral area and to prevent deformation and disconnection of the hamming part.

13. An electronic device comprising:
    a case frame including a receiving space;
    a substrate assembly accommodated in the receiving space; and
    a display module including a window and a Liquid Crystal Display (LCD) unit mounted under the window, the display module electrically connected to the substrate assembly and coupled to the case frame using a double-sided tape to form an exterior of the electronic device,
    wherein the double-sided tape adheres the window and the LCD unit or the assembly comprising the LCD unit together.

14. The electronic device of claim 13, wherein the double-sided tape comprises a cut line along a boundary between a window adhesive area and an adhesive area of the LCD unit or the assembly comprising the LCD unit such that, when the display module is separated from the case frame, the double-sided tape of a window area is separated along the cut line.

15. The electronic device of claim 13, wherein a tape attaching surface is formed along a rim inside the case frame for attaching a rim of the window using the double-sided tape.

16. The electronic device of claim 15, wherein the tape attaching surface for attaching the double-sided tape is higher than or equal to an inner attaching surface of the case frame excluding the tape attaching surface.

17. An electronic device, comprising:
    a rear case frame comprising a receiving space;
    a substrate accommodated in the receiving space;
    a metallic shield can mounted on the substrate and comprising a hamming part which is folded at least once along a rim;
    at least one subassembly mounted in at least one of the shield can, the substrate, and the rear case frame;
    at least one subunit assembly mounted in the subassembly and electrically connected to the substrate;
    a window finally stacked on the rear case frame and forming an exterior of the electronic device;
    a Liquid Crystal Display (LCD) unit attached under the window;
    an LCD connector drawn from the LCD unit and connected to a back side of the substrate exposed through a connector through hole of the rear case frame by penetrating or detouring the shield can and the substrate; and
    a connector cover configured to face the connector through hole of the rear case frame connected to the LCD connector.

* * * * *